United States Patent [19]
Nerem

[11] Patent Number: 5,142,468
[45] Date of Patent: Aug. 25, 1992

[54] POWER CONDITIONING SYSTEM FOR USE WITH TWO PWM INVERTERS AND AT LEAST ONE OTHER LOAD

[75] Inventor: Arne Nerem, San Diego, Calif.

[73] Assignee: General Atomics, San Diego, Calif.

[21] Appl. No.: 701,487

[22] Filed: May 16, 1991

[51] Int. Cl.[5] .......................... H02M 7/00; H02J 3/00
[52] U.S. Cl. ........................................ 363/71; 307/14; 307/17; 307/31; 307/82; 89/28.1; 42/84
[58] Field of Search ............... 363/41, 71, 98; 307/13, 307/14, 17, 30, 31, 34, 38, 39, 58, 62–64, 82; 89/135, 28.05, 28.1, 40.03, 1.4; 42/84

[56]        References Cited
         U.S. PATENT DOCUMENTS

| | | | |
|---|---|---|---|
| 4,238,688 | 12/1980 | Boettcher, Jr. et al. | 307/31 X |
| 4,349,772 | 9/1982 | Weiss | 318/799 |
| 4,677,535 | 6/1987 | Kawabata et al. | 363/65 |
| 4,736,286 | 4/1988 | Gulczynski | 363/70 |
| 4,802,079 | 1/1989 | Mizoguchi | 363/71 |
| 4,825,144 | 4/1989 | Alberkrack et al. | 363/272 |

FOREIGN PATENT DOCUMENTS 57-80273  5/1982  Japan .

OTHER PUBLICATIONS

Patel, et al., "Generalized Techniques of Harmonic Elimination and Voltage Control in Thyristor Inverters: Part 1-Harmonic Elimination", *IEEE Trans. on Industry Appls.*, pp. 310–317 (May/Jun. 1973).
Weichmann et al., "Generalized Functional Model for Three-Phase PWM Inverter/Rectifier Converters", *IEEE Trans. on Industry Appls.*, pp. 236–246 (Mar./Apr. 1987).

Primary Examiner—Steven L. Stephan
Assistant Examiner—Emanuel Todd Voeltz
Attorney, Agent, or Firm—Fitch, Even, Tabin & Flannery

[57]                ABSTRACT

A coupling circuit (30) connects two three-phase pulse width modulated (PWM) inverter circuits (16, 18), used in conventional manner to power a first load (12), in order to independently power a second load (32). In a preferred embodiment, the two PWM inverter circuits propel an armored vehicle, such as a tank, with one motor driving the right side, and the other motor driving the left side. The propulsion of the vehicle represents the first load. The second load is a pulse forming network (PFN), which PFN powers an electrothermal gun system carried by the vehicle. The coupling circuit includes a transformer (TA, TB, TC) and rectifier circuit (34) for each phase output of the PWM inverters. A primary winding (32) of each transformer is connected between corresponding phase outputs of the two PWM inverters. A secondary winding of each transformer is connected to a respective rectifier circuit. The output of each rectifier circuit is joined with the other rectifier outputs to charge the PFN. Charging of the PFN is controlled using a phase shift network (28) that selectively adjusts the phase shift between the carrier signals applied to the two PWM inverters, with a zero phase shift reducing the charging current to zero, and a 180° phase shift increasing the charging current to a maximum. A feedback sensor (38) detects the current, voltage and/or power of the PFN output, and these sensed parameters in turn control the phase shift between the two carrier signals so as to produce and/or maintain a specified PFN charging current.

20 Claims, 4 Drawing Sheets

POWER CONDITIONING SYSTEM FOR USE WITH TWO PWM INVERTERS AND AT LEAST ONE OTHER LOAD

BACKGROUND OF THE INVENTION

The present invention relates to a single electric power conditioning system that ext power from a pair of pulse width modulated (PWM inverter circuits ("inverters") that are being used for a first function in order to independently operate and power a second function. The first function may be, e.g., to propel respective sides of an armored vehicle, such as a tank; and the second function may be to charge a pulse forming network (PFN) used with an electrothermal gun carried by the tank.

In modern tanks employing electrothermal guns and other advanced gun systems and armor, it would be desirable to charge the PFN driving the gun system from the same power conditioner that is providing propulsion for the vehicle. Such would greatly simplify the electrical power system carried in the tank, thereby making the tank more reliable and less expensive. Unfortunately, the function of charging the PFN has heretofore required a complete separate power conditioning system because of the complexity in the switching that would have to be done between the PWM inverters and the PFN charging system. Hence, there is a need in the art for a simplified power conditioning system for use on armored vehicles that can be shared between multiple functions.

Further, there are numerous other types of electrically-powered systems that use electrical energy to power multiple functions. For example, a "crawler crane" may use electrical energy to propel the crane base, and electrical energy to raise and lower a winch. All such electrically-powered systems could benefit from a simplified power conditioning system that would allow electrical power from a single power source to be independently delivered to each of the various functions.

The present invention advantageously addresses the above and other needs.

SUMMARY OF THE INVENTION

In accordance with one aspect of the present invention, a coupling circuit connects two pulse width modulated (PWM) inverters, used to power a first load, in order to independently power a second load. Each PWM inverter utilizes a carrier signal and at least one phase control signal in order to selectively control the amount of power delivered to the first load in conventional manner. In a preferred embodiment, the two PWM inverter circuits respectively drive two motors used to propel an armored vehicle, such as a tank. One motor drives the right side of the vehicle, and the other motor drives the left side. The propulsion of the vehicle thus represents the first load. In this preferred embodiment, the second load may be a pulse forming network (PFN), which PFN powers an electrothermal gun system carried by the armored vehicle.

The coupling circuit used to independently power the second load includes a transformer and rectifier circuit for each phase output of the PWM inverters. Typically, the PWM inverters are designed for three-phase operation. Hence, the coupling circuit typically includes three separate transformers and rectifier circuits. A primary winding of each transformer is connected between corresponding phase outputs of the two PWM inverters. A secondary winding of each transformer is connected to a respective rectifier circuit. The output of each rectifier circuit is then joined or summed with the other rectifier outputs in order to provide power for the second load, e.g., to charge a PFN.

In accordance with another aspect of the invention, the amount of power delivered to the second load is advantageously controlled by selectively adjusting the phase shift between the carrier signals applied to the two PWM inverters. A zero phase shift reduces the delivered power to zero, and a 180° phase shift increases the delivered power to a maximum. Feedback sensors are used, as desired, to detect the current, voltage and/or power delivered to the second load. The parameter(s) thus sensed is then used, in turn, to automatically control the phase shift between the two carrier signals so as to deliver and/or maintain a specified power level (voltage and/or current) for the second load.

In accordance with yet another aspect of the invention, a single power conditioner provides power for at least two separate functions. Two inverter circuits are used to provide power for a first function. These two inverter circuits are further coupled together so that power is efficiently and controllably extracted therefrom and used to provide power for a second function. The first function may be propelling and/or steering an electric-driven vehicle, such as a tank or crane platform, by controlling respective drive motors on each side of the vehicle. The second function may be powering any other electrically powered subsystem used on the vehicle, such as charging a PFN, positioning a boom, raising/lowering a winch, or the like.

Broadly stated, then, applicant's invention relates to a power delivery system that uses at least a pair of inverters, each driving a respective load. The drive signals associated with each phase of each inverter are combined to drive an additional load. The amount of power delivered to the additional load is controlled by changing the phase shift between the carrier signals supplied to the respective inverters.

One embodiment of the power delivery system may be characterized as a power system that delivers electrical power to at least two loads. Such power system includes: (1) a primary power source; (2) means for generating first and second carrier signals, where these first and second carrier signals have the same circuits, each inverter circuit having input means for receiving: (a) input power from the primary power source, (b) a respective one of said first or second carrier signals, and (c) at least one phase control signal; each inverter circuit further having at least one phase output for delivering output power to a load as controlled by the respective carrier signal and the phase control signal; (4) a first load coupled to the phase output of at least one of the inverter circuits, with power being delivered to the first load as controlled by the respective carrier signal and phase control signal; and (5) combining means for combining corresponding phase outputs from the first and second inverter circuits and for delivering power obtained through the combining means to a second load, with the amount of power delivered to the second load being controlled by the phase difference between the first and second carrier signals.

Another embodiment of the invention may be characterized as a power system that provides controlled electrical power to first and second subsystems within an electrically powered apparatus. Such a power system includes: (1) a primary power source; (2) first delivery means for delivering a controlled amount of electrical power from the primary power source to the first subsystem; and (3) second delivery means for extracting a controlled amount of electrical power from the power made available for delivery to the first subsystem, and delivering this extracted electrical power to the second subsystem. Thus, controlled amounts of electrical power may be delivered to both the first and second subsystems.

Still another embodiment of the invention may be characterized as a combined electric drive and charging system for use with an electrically driven vehicle, such as a tank. Such combined system includes a source of electrical energy. It also includes a first pulse width modulated (PWM) inverter for driving a first load with power obtained from the source of electrical energy. This first PWM inverter circuit has means for switchably and repetitively applying a first drive current pulse to the first load. Such first drive current pulse has a pulse width, repetition rate and polarity controlled by a first carrier signal and at least one first phase control signal. The electrical power delivered to the first load is thus controlled by the first carrier signal and the applicable phase control signal(s) applied to the first PWM inverter.

The combined electric drive and charging system also includes a second PWM inverter, for driving a second load with power obtained from the source of electrical energy. Like the first PWM inverter, this second PWM inverter circuit has means for switchably and repetitively applying a second drive current pulse to the second load. This second drive current pulse also has a pulse width, repetition rate and polarity controlled by a second carrier signal and at least one second phase control signal. Thus, the electrical power delivered to the second load is controlled by the second carrier signal and the applicable second phase control signal(s) applied to the second PWM inverter.

Further included in the combined electric drive and charging system are means for generating the first and second carrier signals and the at least one first and second phase control signal(s), as well as phase adjustment means for selectively adjusting the phase between the first and second carrier signals. Also included are extraction means for generating a drive current phase difference signal and extracting the energy contained therein for powering a third load. The drive current phase difference signal corresponds to a maximum energy content when the phase difference between the first and second drive current pulses is a maximum, and a minimum energy content when the phase difference between the first and second drive current pulses is a minimum. Hence, the power delivered to the third load, which is also advantageously obtained from the same source of electrical energy used to drive the first and second PWM inverters, is controlled by adjusting the phase between the first and second carrier signals, which adjustment changes the phase between the first and second drive current pulses.

It is thus a feature of the present invention to provide a single power conditioning system for use by an electrically-driven apparatus, such as a tank or similar vehicle, that provides power for two independent functions, e.g. propulsion of the apparatus, and at least one other load, such as charging a pulse-forming network used by an electrothermal gun carried by the apparatus.

It is another feature of the invention to provide such a single power conditioning system that reduces the size and bulk of the power conditioning system by a factor of approximately two (2) over that which would be required without the invention to provide power conditioning for the same functions, e.g., to provide electric propulsion (in order to move and steer a tank) and PFN charging (in order to power an electrothermal gun or other armor). This reduction is made possible in an electrically-driven and powered tank because the electrothermal guns and armor systems in combination require approximately the same electrical power in terms of charging the PFN as the vehicle requires for drive power. It is therefore advantageous to utilize the same electric power conditioning for the charge purpose as is used for the propulsion purpose.

It is another feature of the invention to provide a means for charging a pulse forming network (PFN) used by an electric gun system and armor, or other similar uses which require stored energy from the same power conditioning system that is used to propel the vehicle on which the electric gun systems and armor (or other systems using pulse power) are carried. Such is accomplished by employing a phase regulation technique that displaces the phase of the two carrier signals of the pulse width modulated (PWM) inverters (used to propel the vehicle) proportionately to the power requirement of the PFN at the time.

It is to be emphasized that the power conditioning system described herein is not limited to use with tanks, or similar military vehicles, that carry electrothermal guns. The invention may be used with any type of apparatus or system that requires independent electrical power for separate functions or loads, one function or load of which is driven and controlled by separate PWM inverters. For example, the invention may be used with an electric crane, where PWM inverters are used to drive and steer the crane base and/or an extendable arm, and a suitable electrical charging/storing system is used to power a winch supported by the extendable arm.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
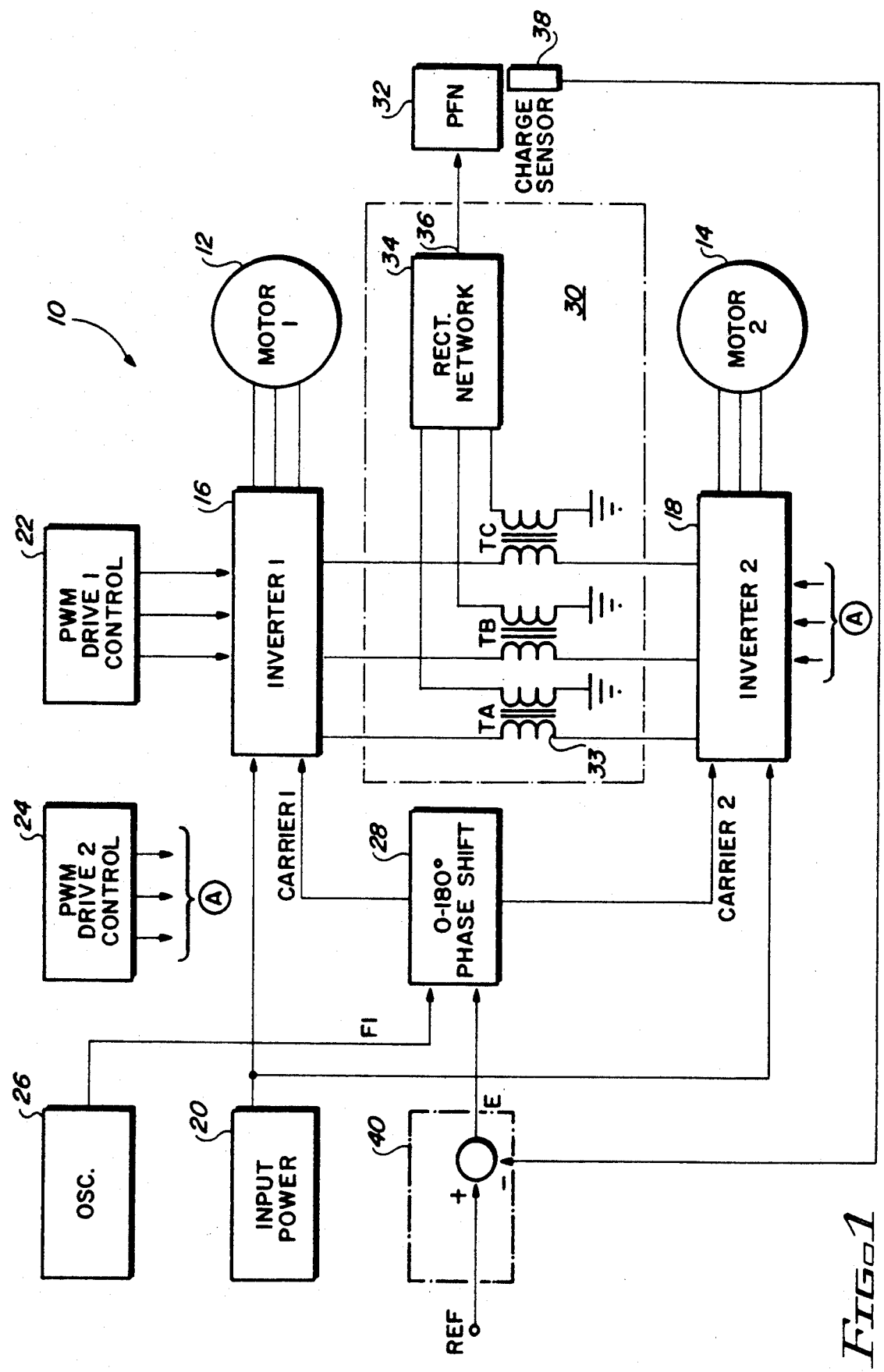
FIG. 1 is a block diagram of one embodiment of the present invention.

FIG. 1 is a block diagram of one embodiment of a power conditioning system 10 made in accordance with the present invention. The embodiment shown in FIG. 1 assumes that the conditioning system 10 is used with an armored vehicle, such as a tank. However, as indicated above, the power conditioning system may be used with numerous other types of vehicles or electrically-powered systems.

As seen in FIG. 1, the tank includes two three-phase motors 12 and 14. The motor 12 (also labeled Motor 1) is driven by a first inverter 16 (also labeled inverter 1). The second motor 14 (also labeled Motor 2) is likewise driven by a second inverter 18 (also labeled inverter 2). The inverters 16 and 18 may be of conventional design, and are preferably pulse width modulated (PWM) controlled with appropriate phase control signals obtained respectively from PWM Drive Control circuits 22 and 24. The PWM Drive Control circuits 22 and 24 may also be of conventional design. Raw input power is provided to the inverters 16 and 18 from a single primary power source 20.

The inverters 16 and 18 are used to drive the motors 12 and 14 in conventional manner in order to propel and steer the tank. That is, the motor 12 is coupled to the drive track on one side of the tank, and the motor 14 is coupled to the drive track on the other side of the tank. By controlling the motors 12 and 14 through use of the phase control signals (generated by the PWM Drive Control circuits 22 and 24), the motors can be made to rotate at any desired speed, direction, and torque, thereby allowing the tank to be propelled and steered as desired. Such propulsion and steering of a tank (or other electrically-driven vehicle) using independent three-phase motors, one coupled to each side of the vehicle, each being driven from a PWM inverter circuit as controlled by appropriate phase control signals, is known in the art.

As used in the prior art, such propulsion systems utilize a common carrier signal in each of the inverter circuits. In accordance with the power conditioning system of the present invention, however, a first carrier signal, labeled Carrier 1, is applied to the inverter 16; and a second carrier signal, labeled Carrier 2, is applied to the inverter 18. As seen in FIG. 1, these carrier signals are derived from a basic oscillator 26 that produces a primary carrier signal F1. The primary signal F1 is applied to a phase shift network 28. The phase shift network 28 splits the carrier signal F1 into the two carrier signals, Carrier 1 and Carrier 2. Further, the phase shift network 28 creates a phase difference between the two carrier signals that varies between 0 to 180° as a function of an applied error signal E. Thus, the signal Carrier 1 has the same frequency as the signal Carrier 2, but there exists a phase difference between the two signals that is controlled by the error signal E. The phase shift network 28 may be of conventional design.

A coupling circuit 30 couples the inverter 16 to the inverter 18. As will be more evident from the description that follows, the coupling circuit 30 extracts power from the inverter circuits 16 and 18 and makes such power available for other purposes (other than powering the motors 12 and 14), which other purposes may be considered as a secondary load. For the embodiment shown in FIG. 1, the secondary load includes a pulse forming network (PFN) 32 that is charged by the power extracted through the coupling circuit 30. The charged PFN 32 may then be used in conventional manner to drive an electrothermal gun or other armor system(s) carried by tank.

A key feature of the power conditioning system 10 shown in FIG. 1 is the ability to selectively control the amount of power that is extracted by the coupling circuit 30 through the inverter circuits 16 and 18. Advantageously, such extraction occurs substantially independent of the power being delivered by the inverters 16 or 18 to their respective motor loads 12 and 14. Obviously, the coupling circuit 30 cannot extract more power than is available from the primary power source 20. Thus, if inverter 16 is driving 18 is driving motor 14 at the same time that inverter 18 is driving motor 14 at maximum power, and if the combined power used by both motors is approaching the limit of the power source 20, then the coupling circuit 30 will not be able to extract much power, if any, for delivery to the secondary load 32. However, other than for this limitation (i.e., within the limits of the power source 20), the coupling circuit 30 is able to independently extract power through the inverter circuits 16 and 18 and deliver it to the secondary load 32 independent of the power being delivered to the primary loads 12 and 14.

The amount of power extracted by the coupling circuit 30 is controlled by adjusting the phase difference between the respective carrier signals applied to the inverters 16 and 18. (In contrast, the amount of power delivered to the motors 12 and 14 is controlled by adjusting the phase control signals generated by the PWM Drive Control circuits 22 and 24.) Thus, when the Carrier 1 signal is in phase with the Carrier 2 signal, corresponding nodes available at the outputs of the inverters 16 and 18 are also in phase. These corresponding nodes are interconnected by the primary winding of a transformer, such as the winding 33 of transformer TA. For a three phase inverter, three transformers are used, TA, TB and TC, which transformers comprise part of the coupling circuit 30. Under "in-phase" conditions, there is no voltage potential developed across the primary winding, and hence no current flow therethrough, and no power is extracted from the inverter circuits 16 and 18. However, when the Carrier 1 signal is out of phase with the Carrier 2 signal, then the corresponding output nodes of the inverter circuits are also out of phase. Under such "out-of-phase" condition, a voltage potential is developed across the primary winding, and hence a current does flow therethrough, and power is extracted through the secondary winding of the transformer. As shown in FIG. 1, the secondary windings of the transformers TA, TB and TC are joined in a rectifying network 34. An output 36 of the rectifying network 34 thus provides the total extracted power to the secondary load 32.

As seen in FIG. 1, a sensor 38 is utilized in conjunction with the secondary load 32 in order to sense a specified parameter. Typically, the sensor 38 will be used to sense the amount of power delivered to the secondary load 32, e.g., by sensing voltage and/or current. For the particular embodiment shown in FIG. 1, where the secondary load is a PFN, the sensor 38 senses the charge held in the PFN.

The sensor 38 generates a feedback signal S1 that is representative of the parameter thus sensed. This signal S1 is fed back to a processing circuit 40, where it is compared to a programmable or selectable reference signal. The difference between the reference signal and the signal S1 is used as an error signal, E. The error signal E, in turn, is directed to the phase shift network 28 in order to controllably adjust the phase between the Carrier 1 signal and the Carrier 2 signal so as to yield and/or maintain a desired power level (e.g., charge level) at the secondary load.

Figure 2:
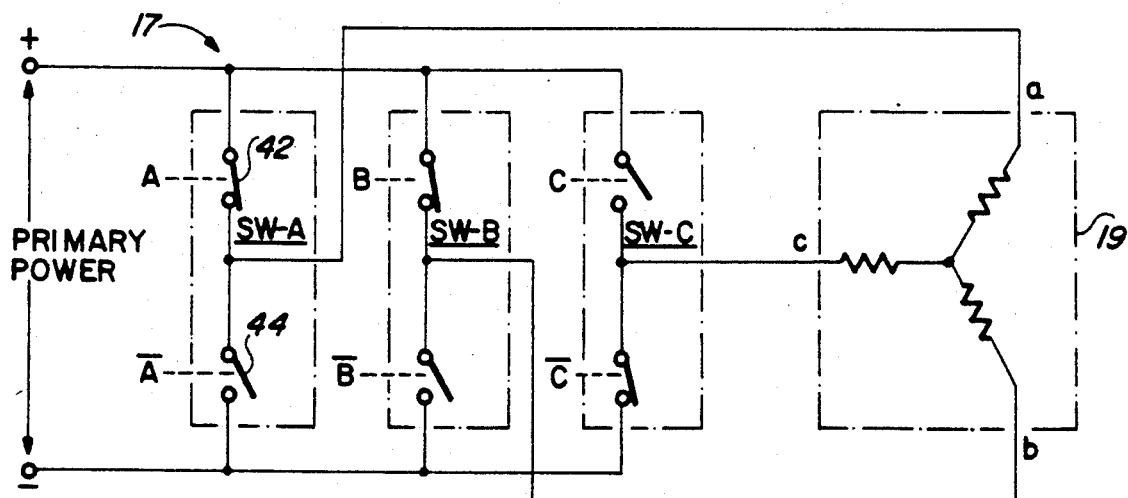
FIG. 2 is a functional schematic diagram of a three-phase inverter circuit.
Figure 3B:
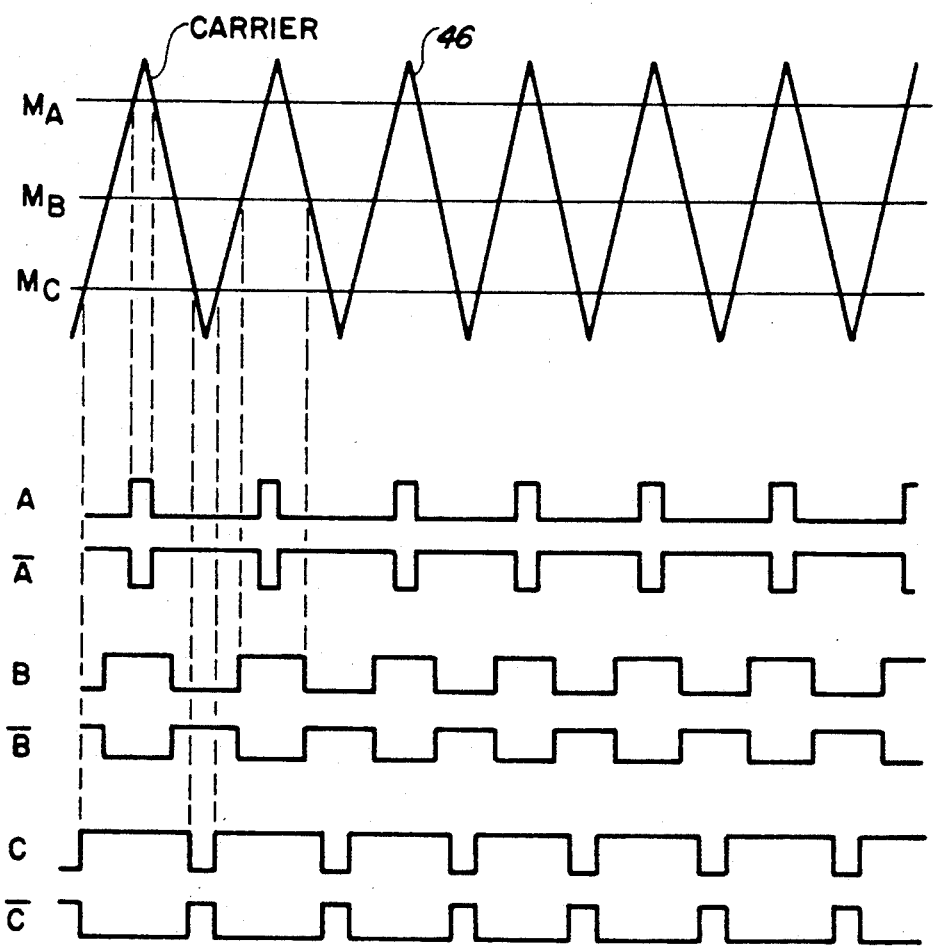
FIGS. 3A and 3B are waveform timing diagrams used to illustrate the operation of a three phase inverter circuit.
Figure 3A:
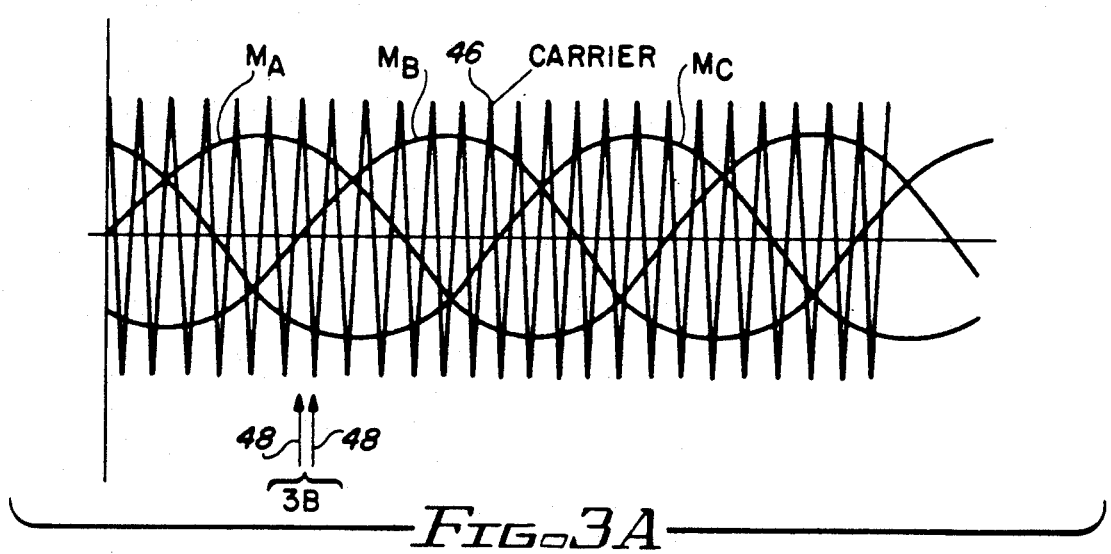

As an aid to further understanding the operation of the present invention, reference is next made to FIGS. 2, 3A and 3B where there is shown a functional schematic diagram of a three-phase inverter circuit 17, a load 19, and the timing waveform diagrams associated with the operation of the inverter circuit 17. As seen in FIG. 2, the inverter 17 functionally includes three sets of switches, SW-A, SW-B, and SW-C connected in parallel between the positive and negative terminals of the primary power source 20. Each set of switches includes a pair of switches connected in series. For example, the set of switches SW-A includes an upper switch 42 and a lower switch 44.

The switches of each set are controlled with appropriate control signals. The control signals for the switch set SW-A are identified as A and e,ovs/A/, with the control signal A serving to control the upper switch 42 and the control signal e,ovs/A/ serving to control the lower switch 44. When a given control signal is high, the switch controlled by such signal is closed. When a given control signal is low, the switch controlled by such signal is open. Similar control signals B and e,ovs/B/ control the upper and lower switches in switch set SW-B; and control signals C and e,ovs/C/ control the upper and lower switches in switch set SW-C.

The control signals, as seen best in FIG. 3B, are complements of each other, one being high when the other is low, and vice versa. Thus, when one switch of a given switch set is open, the other switch of the same switch set is closed. This is important because if both switches were to be closed at the same time, the power source would be shorted.

Thus, at a given instant of time, power is delivered to the load 19, e.g., by closing the upper switch 42 of the switch set SW-A (which means opening the lower switch 44 of the same set), closing the upper switch of switch set SW-B (which means opening the lower switch of the same set), and opening the upper switch of switch set SW-C (which means closing the lower switch of the same set). This action causes the positive terminal of the primary power source to be connected to nodes "a" and "b" of the load 19, and the negative terminal of the primary power source to be connected to node "c" of the load 19. Thus current flows into the load 19 through nodes "a" and "b", and returns through node "c". A change in the control signals causes this distribution of current to also change. For example, if switch 42 in switch set SW-A were opened (meaning that switch 44 would be closed), and if the switches in switch sets SW-B and SW-C remained as shown in FIG. 2, then current would flow into node "b" of load 19 and return through nodes "a" and "c". If all of the switch sets were set to the same state, e.g., if all of the upper switches were opened (meaning all of the lower switches would be closed), then no current would flow into the load, and the load would effectively be disconnected from the primary power source.

Referring next to FIG. 3A, there is shown a timing waveform diagram that illustrates a preferred manner of generating the control signals A and $\overline{A}$, and B and $\overline{B}$, and C and $\overline{C}$, used with the inverter circuit 17. It is noted that which is to be described is not the only way such control signals could be generated, but it is representative of a common technique used for driving a PWM three-phase inverter. A carrier signal 46 is modulated with three modulation signals, $M_A$, $M_B$ and $M_C$. As shown in FIG. 3A, the modulation signals, which are representative of the phase control signals generated by the PWM Drive Control circuits 22 and 24 (FIG. 1), are 120° out of phase with each other, with the signal $M_B$ lagging the signal $M_A$ by 120°, and the signal $M_C$ lagging the signal $M_B$ by 120°. This particular phase relationship is representative of that which is commonly used in order to cause the three-phase motor to rotate in one direction. If the motor is to be rotated in the other direction, then a different phase relationship is used, e.g., with the signal $M_C$ lagging the signal $M_A$ by 120°, and the signal $M_B$ lagging the signal $M_C$ 120°. If the motor is to be stopped, then the frequency of the three modulation signals is reduced to zero. Such operation of three-phase motors, and variations thereof, is well known and practiced in the art. See, e.g., Patel et al., "Generalized Techniques of Harmonic Elimination and Voltage Control in Thyristor Inverters: Part I— Harmonic Elimination", *IEEE Transactions on Industry Applications*, May/Jun. 1973, pp. 310-17; and Weichmann et al., "Generalized Functional Model for Three-Phase PWM Inverter/Rectifier Converters", *IEEE Transactions of Industry Applications*, Vol. 1A-23, No. 2, pp. 236-46 (Mar./Apr. 1987).

It is noted that the carrier signal 46 shown in FIG. 3A is shown with a greatly reduced frequency over that which is normally used. This is done for clarity in FIG. 3A. Typically, for a given narrow window of time, such as the time between the two arrows 48 in FIG. 3A, there will be numerous complete cycles of the carrier signal 46, as shown in FIG. 3B. That is, FIG. 3B more accurately depicts the carrier signal 46 and the modulation signals $M_A$, $M_B$ and $M_C$ as they would appear for a short moment in time. As seen in FIG. 3B, the carrier signal is preferably a triangular wave, ramping up to a peak value and ramping down to a peak value with a prescribed slope. When the carrier signal is greater than the modulation signal $M_A$, the control signal A goes high. At all other times, the control signal A is low. Similarly, when the carrier signal is less than the modulation signal $M_A$, the control signal $\overline{A}$ is high. At all other times, the control signal $\overline{A}$ is low. In this way, the control signal A and are generated so as to be complements of each other.

In a similar manner the control signal B (and its complement) and the control signal C (and its complement) are generated to be high (or low) when the carrier signal is greater than the modulation signals $M_B$ and $M_C$, respectively.

Thus, as the modulation signals vary relative to the carrier signal, the control signals change their pulse widths and pulse spacings accordingly. This action, in turn, switchably connects the primary power source across the respective nodes of the load for the durations determined by the pulse widths and in the sequence determined by the relative phase between the modulation signals. In this manner, the primary power delivered to the load is "pulse width modulated" by the inverter circuit in order to bring about a desired result.

Figure 4:
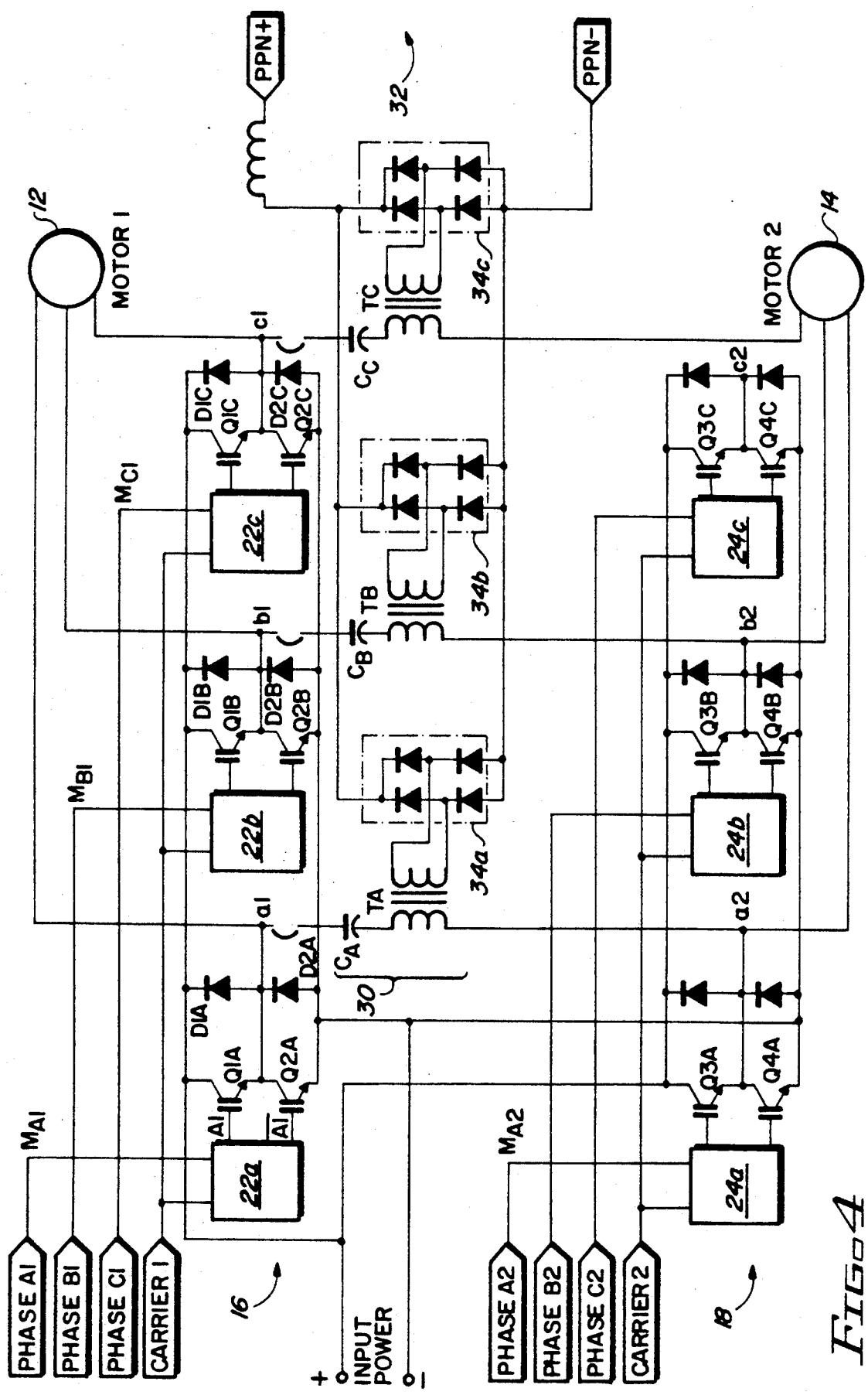
FIG. 4 is a schematic block diagram of a combined electric drive and PFN charging system made in accordance with the present invention.

Turning next to FIG. 4, a schematic block diagram of a power delivery system made in accordance with the present invention is shown. FIG. 4 closely parallels the block diagram shown in FIG. 1, at least insofar as certain elements are concerned (there are some elements not shown in FIG. 4 that are included in FIG. 1, such as the phase shift network 28). A PWM control circuit 22a generates the necessary control signals A1 and $\overline{A1}$ for driving a first set of transistor switches Q1A and Q2A and within the inverter 16. The control signals A1 and $\overline{A1}$ are generated using the Carrier 1 signal and the modulation signal $M_{A1}$ as described above in connection with FIGS. 3A and 3B, or equivalent. Reverse current diodes D1A and D2A are connected across the transistor switches Q1A and Q2A, respectively, in order to clamp the reverse voltage that may appear across these transistors to a safe level, and to provide a current path when these transistors are turned off. The emitter of transistor Q1A and the collector of transistor Q2A comprise a node "a1" that is connected to a corresponding node of the motor load 12.

In a similar manner, PWM control circuits 22b and 22c generate the necessary control signals for driving respective sets of transistor switches Q1B-Q2B and Q1C-Q2C. Node "b1" and node "c1" from each of these transistor switch sets are respectively connected to corresponding nodes of the motor load 12.

Similar PWM control circuits 24a, 24b and 24c generate the necessary control signals for driving respective sets of transistor switches Q3A-Q4A, Q3B-Q4B and Q3C-Q4C associated with the inverter 18 that drives motor 14. Nodes "a2", "b2" and "c2" from each of these transistor switch sets are respectively connected to corresponding nodes of the motor load 14.

As further seen in FIG. 4, the coupling circuit 30 includes transformers TA, TB and TC. A primary winding of each transformer is respectively connected between corresponding nodes of the inverters 16 and 18. That is, one end of the primary winding of transformer TA is connected to node "a1" of inverter 16. The other end of the primary winding of transformer TA is connected to node "a2" of inverter 18. Similarly, the primary winding of transformer TB is connected between nodes "b1" and "b2"; and the primary winding of transformer TC is connected between nodes "c1" and "c2". A dc blocking capacitor $C_A$ is placed in series with the primary winding of transformer TA in order to provide dc and harmonic isolation between the inverters 16 and 18. Similar blocking capacitors $C_B$ and $C_C$ are used with transformers TB and TC.

The secondary winding of transformer TA is connected to a full wave rectifier circuit 34a, comprising 4 diodes connected in a conventional full-wave rectifier configuration. Similarly, the secondary windings of transformers TB and TC are connected to full wave rectifier circuits 34b and 34c. The rectified outputs of each of the rectifier circuits 34a, 34b and 34c are joined together and presented to the secondary load 32, e.g., the positive and negative input terminals of the PFN.

Figure 5A:
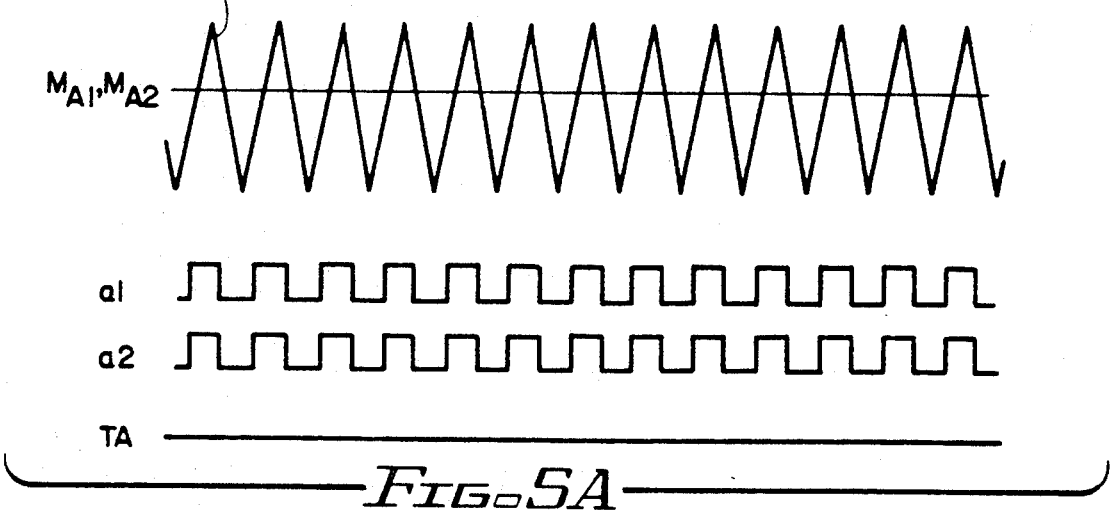
FIGS. 5A and 5B are waveform timing diagrams illustrating the operation of the combined electric drive and PFN charging system of FIG. 4.

The operation of the coupling circuit 30 will next be explained in connection with the timing waveform diagrams of FIGS. 5A and 5B. If the two carrier signals, Carrier 1 and Carrier 2, are in phase, and assuming that the respective modulation signals are the same, then the output signals appearing at corresponding nodes of the inverters 16 and 18 are also in phase, as shown in FIG. 5A for the modulation signals $M_{A1}$ and $M_{A2}$ and the nodes "a1" and "a2". (The output signals appearing at nodes "b1" and "b2", and "c1" and "c2" would also be in phase for this same assumption.) As such, there is no voltage developed across the primary windings of any of the transformers. Hence, as shown in FIG. 5A, the output of the transformer TA is zero.

Figure 5B:
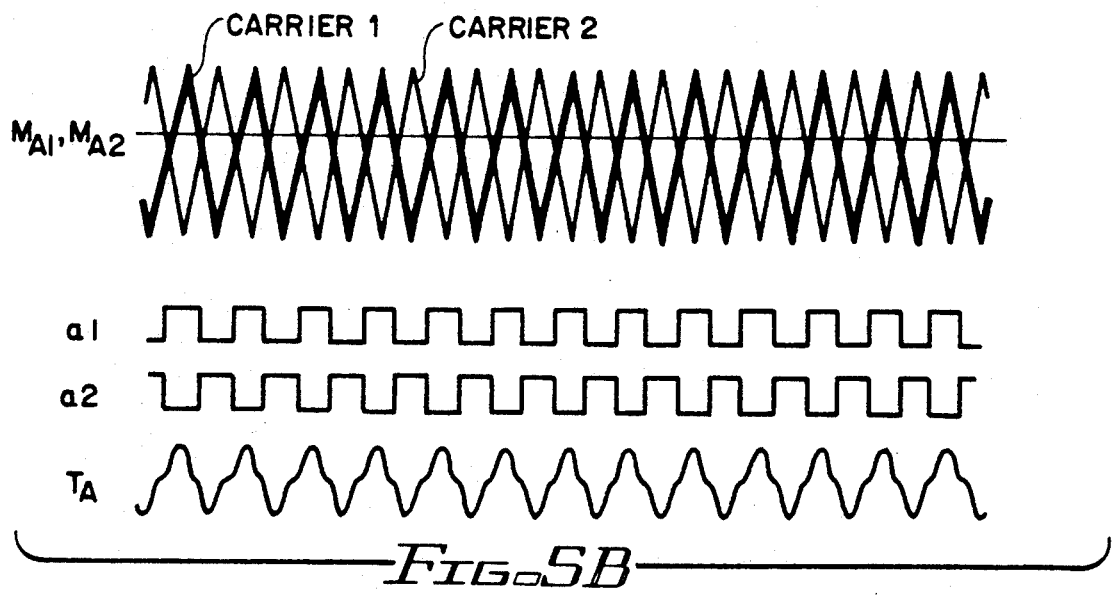

In contrast, if the two carrier signals, Carrier 1 and Carrier 2, are out of phase, and assuming that the respective modulation signals are the same, then the output signals appearing at corresponding nodes of the inverters 16 and 18 are also out of phase by a corresponding amount, as shown in FIG. 5B for the modulation signals $M_{A1}$ and $M_{A2}$ and the nodes "a1" and "a2". (Again, the output signals appearing at nodes "b1" and "b2", and "c1" and "c2" would also be out of phase a corresponding amount for this same assumption.) As such, there is a voltage developed across the primary windings of the transformers. Consequently, as shown in FIG. 5B, an output signal is developed at the output of the transformer TA, as shown in the bottom waveform. This output signal, as depicted in FIG. 5B, is somewhat distorted because the output signals appearing at nodes "a1" and "a2" under the conditions assumed — modulation signals $M_{A1}$ and $M_{A2}$ not at zero — are not exactly symmetrical. (Were the output signals symmetrical, then the output signal of the transformer TA would be more like a sine wave.) In any event, this output signal contains sufficient energy so that when it is rectified, the energy can be presented to the secondary load as power, e.g., a charging current in the case where the secondary load is a PFN.

As evident from the above description, as the relative phase between the carrier signals is adjusted, the output signal from the respective transformers TA, TB and TC varies from zero for signals that are in phase (0° phase difference), to a maximum value for carrier signals that are 180° out of phase. This assumes, of course, that the modulation signals applied to each inverter, e.g., the signals $M_{A1}$ and $M_{A2}$, are synchronized. In the case where the modulation signals $M_{A1}$ and $M_{A2}$ are of different frequency and/or phase rotation (when the tank is turning or rotating) the pulse widths of the respective inverter drive signals vary in accordance with the amount of modulation (amplitude). The resulting output from transformers $T_A$, $T_B$, and $T_C$ will be maintained constant at the demand level by the feedback control of the phase difference between the respective carrier signals.

It is noted that where the invention is used to provide a combined electric drive and charging system, charging and propulsion can take place simultaneously. As long as the vehicle is stationary, full capability for the PFN charging system is available. When the vehicle is accelerating at maximum power, reduced PFN charging capability is available to the extent that the power rating of the inverters permit and the capacity of the power source provides. By appropriate power rating or over rating, it is still possible to supply charge power when the vehicle is operating at maximum speed.

When the two sides of the vehicle operate at different speeds, a low frequency component will occur across the phases of the charging system. The dc blocking capacitors $C_A$, $C_B$, and $C_C$ prevent saturation of the transformer magnetic material due to the low frequency component. In each case, automatic control of the charging process takes place based on the total power capability of the system and its operating status.

A significant advantage provided by the invention is the reduction of power conditioning hardware within the vehicle. That is, roughly one half of the mass and volume of power conditioning hardware of a typical tank carrying electric gun systems is used by the power conditioning hardware for the electric propulsion system. Hence, by combining the power conditioning hardware for the propulsion and gun systems, much of this mass and volume is eliminated.

It is noted that for a typical application where the invention is used in a tank, the operating frequency of the carrier signal will be in the range of 3,000 to 30,000 Hz. The modulation signals will vary from zero Hz (dc) to about 400 Hz. The power delivered to each drive motor averages about 300 kilowatts, with a peak power of 1 megawatt. The charge placed on the PFN may vary from 5 to 10 megajoules, with recharge times on the order 10 seconds. The primary power source in such a tank is typically a diesel or gas turbine (or other fuel-powered) engine driving a 400 volt, 2 megawatt generator.

As described above, it is thus seen that the present invention provides a single power conditioning system that may advantageously be used within an electrically-driven apparatus, such as a tank or similar vehicle, to power two independent functions, e.g. propulsion/steering of the apparatus, and charging of a pulse-forming network used by an electrothermal gun carried by the apparatus.

As also described above, it is seen that the invention provides such a single power conditioning system that significantly reduces the size and bulk of the power conditioning system, e.g., by a factor of approximately two (2), over that which would be required in the absence of the invention in order to provide power conditioning for the same functions.

As further described above, it is seen that the present invention provides a means for charging a pulse forming network (PFN) used by an electric gun system and armor, or other application requiring stored electrical energy, from the same power conditioning system that is used in a pair of PWM converters, or equivalent circuits, used to propel the vehicle on which the electric gun systems and armor (or other systems using stored electrical energy) are carried. This is advantageously accomplished by employing a phase regulation technique that displaces the phase of the two carrier signals of the pulse width modulated (PWM) converters (used to propel the vehicle) proportionately to the power requirement of the PFN at the time.

While the invention herein disclosed has been described by means of specific embodiments and applications thereof, numerous modifications and variations could be made thereto by those skilled in the art without departing from the scope of the invention set forth in the claims.

What is claimed is:

1. A combined electric drive and charging system comprising:
    a source of electrical energy;
    a first pulse width modulated (PWM) inverter circuit for driving a first load with power obtained from said source of electrical energy, said first (PWM) inverter circuit having means for switchably applying a first drive current pulse to said first load, said first drive current pulse having a pulse width and polarity controlled by a first carrier signal and at least one first phase control signal, whereby the electrical power delivered to said first load is controlled by said first PWM inverter circuit;
    a second PWM inverter circuit for driving a second load with power obtained from said source of electrical energy, said second PWM inverter circuit having means for switchably applying a second drive current pulse to have second load, said second drive current pulse having a pulse width and polarity controlled by a second carrier signal and at least one second phase control signal, whereby the electrical power delivered to said second load is controlled by said second PWM inverter circuit;
    generating means for generating said first and second carrier signals and said at least one first and second phase control signals;
    phase adjustment means for selectively adjusting the phase between said first and second carrier signals, whereby the relative phase difference between said first and second drive current pulses can be selectively controlled; and
    extraction means for generating a drive current phase difference signal and extracting the energy contained therein for powering a third load, said drive current phase difference signal having a maximum energy content when the phase difference between said first and second drive current pulses is a maximum, and a minimum energy content when the phase difference between said first and second drive current pulses is a minimum, whereby the power delivered to said first load is also obtained from said source of electrical energy and is controlled by said phase adjustment means.

2. The combined electric drive and charging system as set forth in claim 1 wherein said extraction means includes a transformer and a rectifying network; said transformer having a primary winding and a secondary winding, said primary winding being connected between a node of said first PWM inverter circuit whereat said first drive current pulse is present and a node of said second PWM inverter circuit whereat said second drive current pulse is present; said rectifying network being connected to said secondary winding, an output of said rectifying network being connected to said third load, whereby said third load is charged by power coupled through said transformer from the first and second drive current pulses generated by said first and second PWM inverter circuits.

3. The combined electric drive and charging system as set forth in claim 2 wherein said first and second loads comprise electric motors used to drive respective sides of a vehicle, and wherein said third load comprises a pulse forming network (PFN) used to power an electrothermal gun carried by said vehicle.

4. The combined electric drive and charging system as set forth in claim 3 further including sensing means for sensing the charge associated with said PFN, and means responsive to said sensing means for automatically controlling the phase adjustment means so as to create a phase difference between said first and second carrier signals that delivers a specified charge to said PFN.

5. A power system for delivering electrical power to at least two loads comprising:
    a primary power source;
    means for generating first and second carrier signals, said first and second carrier signals having the same frequency, but having a phase difference therebetween that is selectively adjustable;

first and second inverter circuits, each of said inverter circuits having input means for receiving: (1) input power from said primary power source, (2) a respective one of said first or second carrier signals, and (3) at least one phase control signal; each of said inverter circuits further having at least one phase output for delivering output power to a first load as controlled by said respective carrier signal and said at least one phase control signal;

combining means for combining corresponding phase outputs from said first and second inverter circuits and for delivering power obtained through said combining means to a second load, the amount of power delivered to said second load being controlled by the phase difference between said first and second carrier signals.

6. The power system as set forth in claim 5 wherein said first and second inverter circuits each comprise three-phase inverter circuits controlled by said respective carrier signal and first, second, and third phase control signals, each three-phase inverter circuit further having first, second, and third phase outputs for delivering three-phase power to the first load.

7. The power system as set forth in claim 6 wherein said combining means includes first, second, and third transformers, each transformer including a primary winding and at least one secondary winding, the primary winding of the first transformer being connected between the first phase output of said first and second inverters, the primary winding of the second transformer being connected between the second phase output of said first and second inverters, and the primary winding of the third transformer being connected between the third phase aoutput of said first and second inv erters; power being coupled to said second load through the at least one secondary winding of each transformer.

8. The power system as set forth in claim 7 wherein said first load includes first and second three-phase motors, said first three-phase motor being connected to the first, second, and third phase outputs of said first inverter, and said second three-phase motor being connected to the first, second, and third phase outputs of said second inverter, said first and second motors being independently controlled by said first and second inverter circuits, respectively, to provide a specified function.

9. The power system as set forth in claim 8 wherein said first and second three-phase motors are used to propel and steer an electrically-driven vehicle.

10. The power system as set forth in claim 9 wherein said electrically-driven vehicle comprises an armored military vehicle, such as a tank, and wherein said second load comprises a pulse forming network (PFN) used to power an electrothermal gun carried by said armored military vehicle.

11. A power system for providing controlled electrical power to first and second subsystems within an electrically powered apparatus, said power system comprising:

a primary power source;

first delivery means for delivering a controlled amount of electrical power from said primary power source to said first subsystem comprising:

at least two pulse width modulator (PWM) inverter circuits for delivering power pulses having a controlled pulse width and repetition rate from said primary power source to respective loads, and means for generating respective carrier signals and at least one phase control signal for each of said PWM inverter circuits, said carrier signal and phase control signal being used by each PWM inverter circuit to control the pulse width and repetition rate of the power pulses delivered by said PWM inverter circuit; and second delivery means for extracting a controlled amount of electrical power from the power made available for delivery to said first subsystem and delivering said extracted electrical power to said second subsystem;

whereby controlled amounts of electrical power are delivered to both said first and second subsystems.

12. The power system as set forth in claim 11 wherein said second delivery means includes:

means for selectively adjusting the phase difference between said respective carrier signals, and means for extracting power from respective power pulses output from said at least two PWM inverter circuits as a function of the phase difference between the respective carrier signals applied to said at least two PWM inverter circuits, whereby the amount of power extracted from the respective PWM inverter circuits is controlled by adjusting the phase difference of the respective carrier signals.

13. The power system as set forth in claim 12 wherein said extracting means includes a transformer having a primary and a secondary winding, a first end of said primary winding being connected to a first output of said first PWM inverter circuit, a second end of said primary winding being connected to a corresponding first output of a second PWM inverter circuit, said power pulses delivered by said PWM inverter circuits being present at said first outputs, whereby a maximum phase difference exists between the power pulses present at the first and second ends of said primary winding, and a minimum current flows through said primary winding when a minimum phase difference exists between the power pulses present at the first and second ends of the primary winding, the secondary winding of said transformer being coupled to provide power to said second subsystem.

14. The power system as set forth in claim 13 wherein said first subsystem comprises a propulsion and steering system for an electrically driven vehicle, said propulsion system including a first electric motor for propelling one side of said vehicle, and a second electric motor for independently propelling the other side of said vehicle.

15. The power system as set forth in claim 14 wherein said first and second electric motors are three phase electric motors, and wherein said first and second PWM inverter circuits each provide respective output power pulses for driving the first and second three phase electric motors.

16. The power system as set forth in claim 13 wherein said second subsystem includes a pulse forming network (PWM) for generating an electrical charge adapted to power a second load.

17. The power system as set forth in claim 16 wherein said second load includes an electrothermal gun.

18. The power system as set forth in claim 16 further including means for sensing the amount of electrical charge held by said PFN, and automatic adjustment means responsive to said sensed charge for automatically adjusting the phase difference between the respective carrier signals until a prescribed electrical charge is held by said PFN.

19. The power system as set forth in claim 16 wherein said second subsystem includes an electric winch.

20. A power delivery system comprising:
 at least a pair of inverters, each inverter driving a respective load with multiple phase drive signals, each inverter having a carrier signal associated therewith;
 a DC power source coupled to said inverters; and
 combining means for combining the drive signals associated with each phase of each inverter for driving an additional load;
 the amount of power delivered to the additional load being controllable by changing the relative phase shift between the carrier signals applied to each inverter of said pair of inverters.

* * * * *

UNITED STATES PATENT AND TRADEMARK OFFICE
CERTIFICATE OF CORRECTION

PATENT NO. : 5,142,468

DATED : August 25, 1992

INVENTOR(S) : Nerem

It is certified that error appears in the above-identified patent and that said Letters Patent is hereby corrected as shown below:

Column 1, line 8, change "ext" to --extracts--. Column 1, line 9, change "(PWM" to --(PWM)--. Column 2, line 47, after "same" insert --frequency, but have a phase difference therebetween that is selectively adjustable; (3) first and second inverter--. Column 6, line 21, after "driving" (first occurrence) insert --motor 12 at maximum power-- and delete "18 is driving motor 14." Column 7, lines 29 and 31, replace "e,ovs/A/" with --$\overline{A}$--. Column 7, line 36, replace "e,ovs/B/" with --$\overline{B}$--. Column 7, line 37, replace "e,ovs/C/" with --$\overline{C}$--. Column 8, line 8, after "that" insert --that--. Column 8, lines 22-23, change "eg.," to --e.g.,--. Column 8, line 24, after "$M_c$" insert --by--. Column 8, line 53, change "$\overline{A}$is" to --$\overline{A}$ is--. Column 8, line 54, change "$\overline{A}$is" to --$\overline{A}$ is--. Column 8, line 55, after "and" insert --$\overline{A}$--. Column 9, line 11, change "A1For" to --$\overline{A1}$ for--. Column 9, line 13, after "Q2A" delete "and". Column 9, line 14, change "$\overline{A1}$are" to --$\overline{A1}$ are--.

UNITED STATES PATENT AND TRADEMARK OFFICE
CERTIFICATE OF CORRECTION

PATENT NO. : 5,142,468
DATED : August 25, 1992
INVENTOR(S) : Nerem

It is certified that error appears in the above-identified patent and that said Letters Patent is hereby corrected as shown below:

Claim 1, column 11, line 65, change "(PWM)" to --PWM--. Claim 1, column 12, line 9, change "have" to --said--. Claim 1, column 12, line 32, change "first" to --third--. Claim 7, column 13, line 36, change "aoutput" to --output--. Claim 7, column 13, line 37, change "inv erters" to --inverters--. Claim 13, column 14, line 39, after "maximum" insert --current flows through said primary winding when a maximum--. Claim 16, column 14, line 63, change "(PWM)" to --(PFN)--.

Signed and Sealed this

Twenty-eighth Day of September, 1993

Attest:

BRUCE LEHMAN

*Attesting Officer*        *Commissioner of Patents and Trademarks*